(12) United States Patent
Cassagne et al.

(10) Patent No.: US 9,573,694 B2
(45) Date of Patent: Feb. 21, 2017

(54) ENGINE FASTENER FOR AN AIRCRAFT

(71) Applicant: Airbus Operations (SAS), Toulouse (FR)

(72) Inventors: Jerome Cassagne, Toulouse (FR); Antoine Cousin, L'Union (FR); Thomas Deforet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 47 days.

(21) Appl. No.: 14/719,583

(22) Filed: May 22, 2015

(65) Prior Publication Data

US 2015/0336678 A1 Nov. 26, 2015

(30) Foreign Application Priority Data

May 26, 2014 (FR) ..................... 14 54722

(51) Int. Cl.
*B64D 27/26* (2006.01)
*F16C 23/04* (2006.01)

(52) U.S. Cl.
CPC ............. *B64D 27/26* (2013.01); *F16C 23/046* (2013.01); *B64D 2027/262* (2013.01); *F16C 2326/43* (2013.01)

(58) Field of Classification Search
CPC ............. B64D 27/26; B64D 2027/262; B64D 2027/266; B64D 2027/268
USPC ............... 244/54; 60/796, 797; 248/554–557
See application file for complete search history.

(56) References Cited

U.S. PATENT DOCUMENTS

| 3,006,587 A | 10/1961 | Jumelle et al. |
| 3,141,231 A | 7/1964 | Davies et al. |
| 5,871,176 A * | 2/1999 | Demouzon ............ B64D 27/18 244/54 |
| 6,843,449 B1 * | 1/2005 | Manteiga ............... B64D 27/26 244/54 |
| 7,461,902 B1 | 12/2008 | Darst |
| 2008/0104836 A1 * | 5/2008 | Gratton ..................... B23P 6/00 29/888.011 |
| 2008/0169378 A1 | 7/2008 | Beaufort et al. |

(Continued)

FOREIGN PATENT DOCUMENTS

| EP | 0844172 | 5/1998 |
| WO | 2006097484 | 9/2006 |

OTHER PUBLICATIONS

French Search Report, Jan. 20, 2015.

*Primary Examiner* — Richard G Davis

(74) *Attorney, Agent, or Firm* — Greer, Burns & Crain Ltd.

(57) ABSTRACT

An engine fastener for an aircraft, to secure an engine to a pylon and comprising a fastener body fixed to the pylon and having a cylindrical extension, and a fixing assembly comprising a paddle fixed to the engine and a connection arrangement joined to the paddle and arranged on the cylindrical extension to form a ball-and-socket joint between the cylindrical extension and the paddle. The connection arrangement comprises a ball, formed in one piece, having a central bore in which the cylindrical extension fits, and of which the outer surface is a spherical portion, a fixing element fixing the ball on the cylindrical extension, and two cages, each having an inner surface assuming the form of a spherical portion. The two inner surfaces are arranged opposite one another to house the ball, and for each cage, a joining element joins the cage to the paddle.

6 Claims, 5 Drawing Sheets

(56) References Cited

U.S. PATENT DOCUMENTS

| | | | |
|---|---|---|---|
| 2013/0193298 A1* | 8/2013 | Sandy | B64D 27/26 248/554 |
| 2014/0084129 A1* | 3/2014 | Sandy | B64D 27/26 248/554 |
| 2015/0167726 A1* | 6/2015 | Cassagne | F16B 39/24 411/136 |
| 2016/0076401 A1* | 3/2016 | Besnard | B64D 27/26 248/666 |

* cited by examiner

ENGINE FASTENER FOR AN AIRCRAFT

CROSS-REFERENCES TO RELATED APPLICATIONS

This application claims the benefit of the French patent application No. 1454722 filed on May 26, 2014, the entire disclosures of which are incorporated herein by way of reference.

BACKGROUND OF THE INVENTION

The present invention relates to an engine fastener for an aircraft, an engine assembly comprising an engine, an engine attachment pylon, and a fastener system comprising such an engine fastener, as well as an aircraft comprising at least one such engine assembly.

An aircraft pylon is usually provided so as to form the connection interface between an engine, such as a turbojet, and a structural part, generally the wings, of the aircraft.

The pylon also allows the placement of means suitable for ensuring the transfer of fuel and air, as well as the placement of electrical and hydraulic systems, between the engine and the aircraft.

In addition, the pylon is provided, in particular, with a fastener system disposed between the engine and a rigid structure of the pylon. This fastener system generally comprises at least one front engine fastener and at least one rear engine fastener, of which the arrangement and the design are determined and attested so as to effectively take up the forces and the moments likely to be created along the three axes of the aircraft.

FIG. 6 shows a front engine fastener 700 of the prior art, which comprises, inter alia, a fastener body 702 on which a paddle 752 provided so as to be fixed to the casing of the compressor of the mounted engine. The paddle 752 is mounted on the fastener body 702 by means of a ball-and-socket joint.

The ball-and-socket joint is formed by two shells 756a-b with hemispherical outer surfaces arranged between a cylindrical extension 716 of the fastener body 702 and a bore 704 in the paddle 702. The fixing of the two shells 756a-b is ensured by a panel 712 fixed by four screws 714, which screw into the extension 716 in an axial direction of the extension 716.

Such an arrangement creates a deformation of the two shells 756a-b when the screws 714 are excessively tightened and then a risk of radial jamming of the ball-and-socket joint.

In addition, the position of the screws 714 in a cramped location makes it impossible to increase the diameter of the screws 714 in the case of repair of the threads of the extension.

SUMMARY OF THE INVENTION

An object of the present invention is to provide an engine fastener for an aircraft that does not have the disadvantages of the prior art and that in particular avoids the risks of jamming of the ball-and-socket joint.

To this end, an engine fastener for an aircraft intended to fix an engine to a pylon is provided, the engine fastener comprising:
- a fastener body intended to be fixed to the pylon and having a cylindrical extension, and
- a fixing assembly comprising a paddle intended to be fixed to the engine and connection means joined to the paddle and arranged on the cylindrical extension so as to form a ball-and-socket joint between said cylindrical extension and the paddle, the engine fastener being characterized in that the connection means comprise:
- a ball, which is formed in one piece, which has a central bore in which the cylindrical extension fits, and of which the outer surface is a spherical portion,
- fixing means provided so as to fix the ball on the cylindrical extension,
- two cages, each cage having an inner surface assuming the form of a spherical portion, the two inner surfaces being arranged opposite one another so as to define a housing in which the ball is accommodated, and
- for each cage, connection means provided so as to join said cage to the paddle.

Such an engine fastener has a ball-and-socket joint based on a one-piece ball, which is not stressed as screws are tightened, thus limiting the risks of deformation and of jamming.

BRIEF DESCRIPTION OF THE DRAWINGS

The features of the invention mentioned above and also further features will become clearer upon reading the following description of an exemplary embodiment, said description being provided in conjunction with the accompanying drawings, in which.

DETAILED DESCRIPTION OF THE PREFERRED EMBODIMENTS

Figure 1:
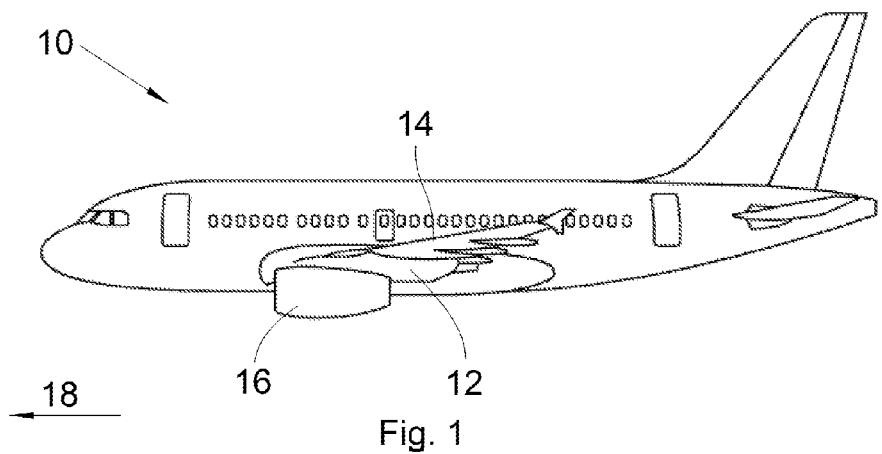
FIG. 1 is a side view of an aircraft according to the invention.

FIG. 1 shows an aircraft 10, which comprises a pylon 12 fixed below the structure of a wing 14 of the aircraft 10. The aircraft 10 also has a nacelle 16 fixed to the pylon 12, inside which nacelle an engine (20, FIG. 2) is arranged.

Figure 2:
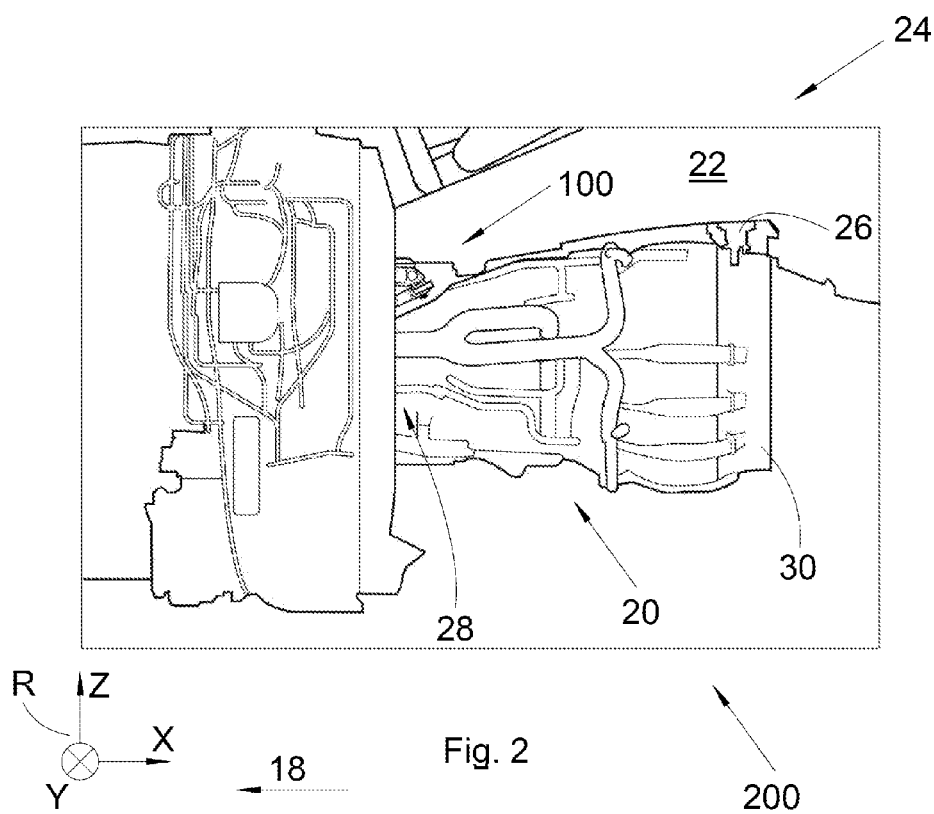
FIG. 2 is a lateral schematic view of an engine assembly according to the invention.

FIG. 2 shows an engine assembly 200, which comprises the engine 20, the pylon 12, to the structure 22 of which the engine 20 is fixed, and a fastener system 24, which comprises a front engine fastener 100 and a rear engine fastener 26, which fix the engine 20 to the structure 22.

In the example presented here, the engine 20 has a casing of the compressor 28 and a central casing 30.

The engine assembly 200 is assigned an orthonormal reference framework R having axes or directions X, Y and Z. It is assumed that:
- the direction X is a longitudinal direction, this direction X passing through the front fastener 100 and being parallel to a longitudinal axis of the engine 20 and substantially parallel to a median longitudinal direction of the pylon 12,
- the direction Y is a transverse direction, oriented transversely relative to the pylon 12, the direction Y being orthogonal to the direction X, and the direction Z is a vertical direction, which is orthogonal to the directions X and Y.

In addition, throughout the description, the terms "front" and "rear" are to be considered relative to a direction of advancement of the aircraft 10 encountered in the event of a thrust exerted by the engine 20, this direction being shown schematically by an arrow 18 in FIGS. 1 and 2.

The rear engine fastener 26 is of the usual type known to the person skilled in the art and will not be described further.

Figure 3:
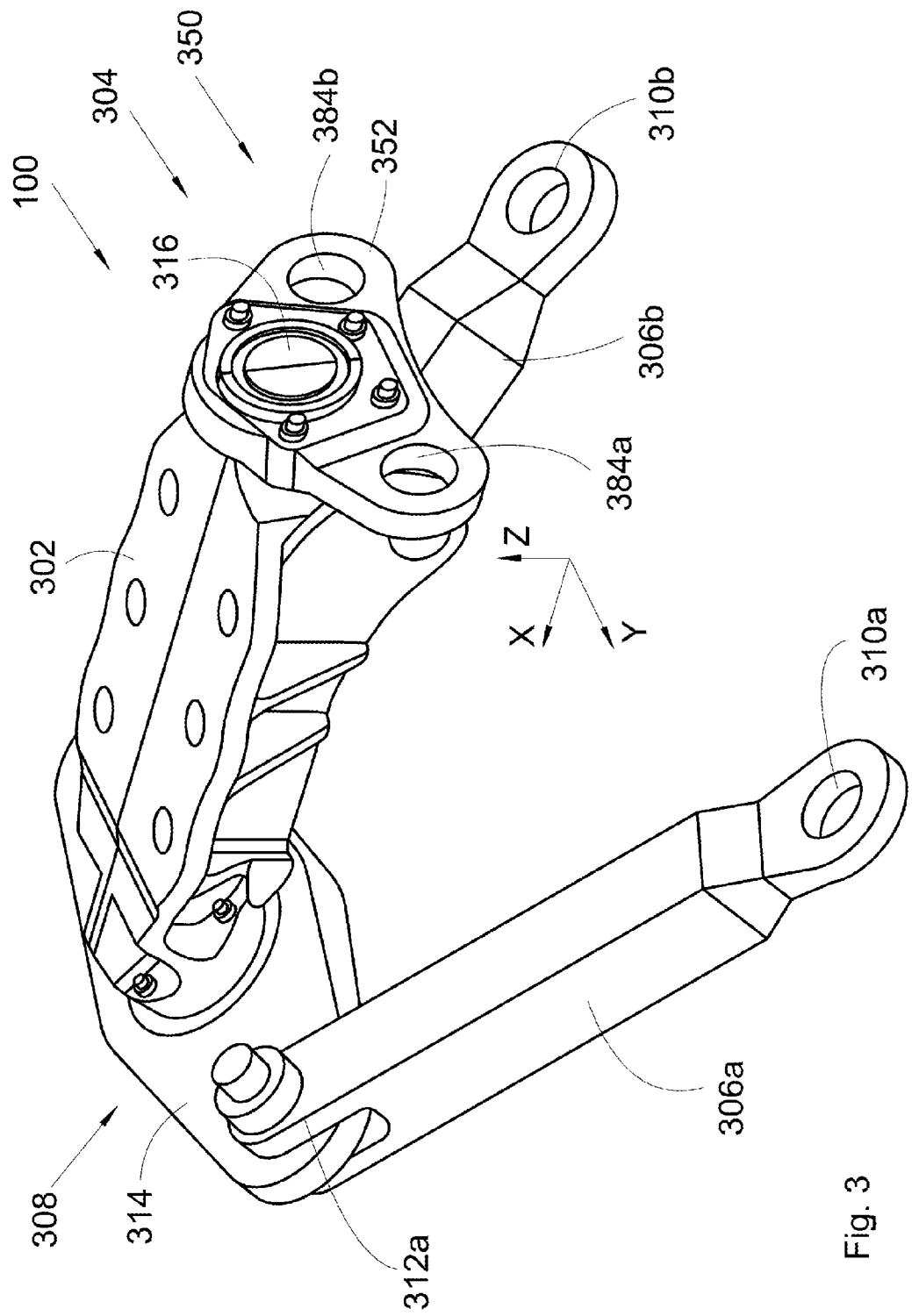
FIG. 3 is a perspective view of an engine fastener according to the invention.

The front engine fastener 100 comprises, as shown in FIG. 3, an elongate fastener body 302, which is mounted in the direction X and which is fixed in the usual manner on the rigid structure 22 of the pylon 12. This fastener body 302 is provided at a front end 304 with a fixing assembly 350 so as to provide a connection to the casing of the compressor 28.

The front engine fastener 100 also comprises two lateral connecting rods 306a-b connected to a rear end 308 of the fastener body 302. The two connecting rods 306a-b are arranged symmetrical with respect to a vertical plane XZ.

The two connecting rods 306a-b are each connected, in a hinged manner, on the one hand by a front end 310a-b to a rear part of the casing of the compressor 28, and on the other hand by a rear end 312a to a yoke plate 314 mounted in a hinged manner to the rear end 308 of the fastener body 302.

Figure 4:
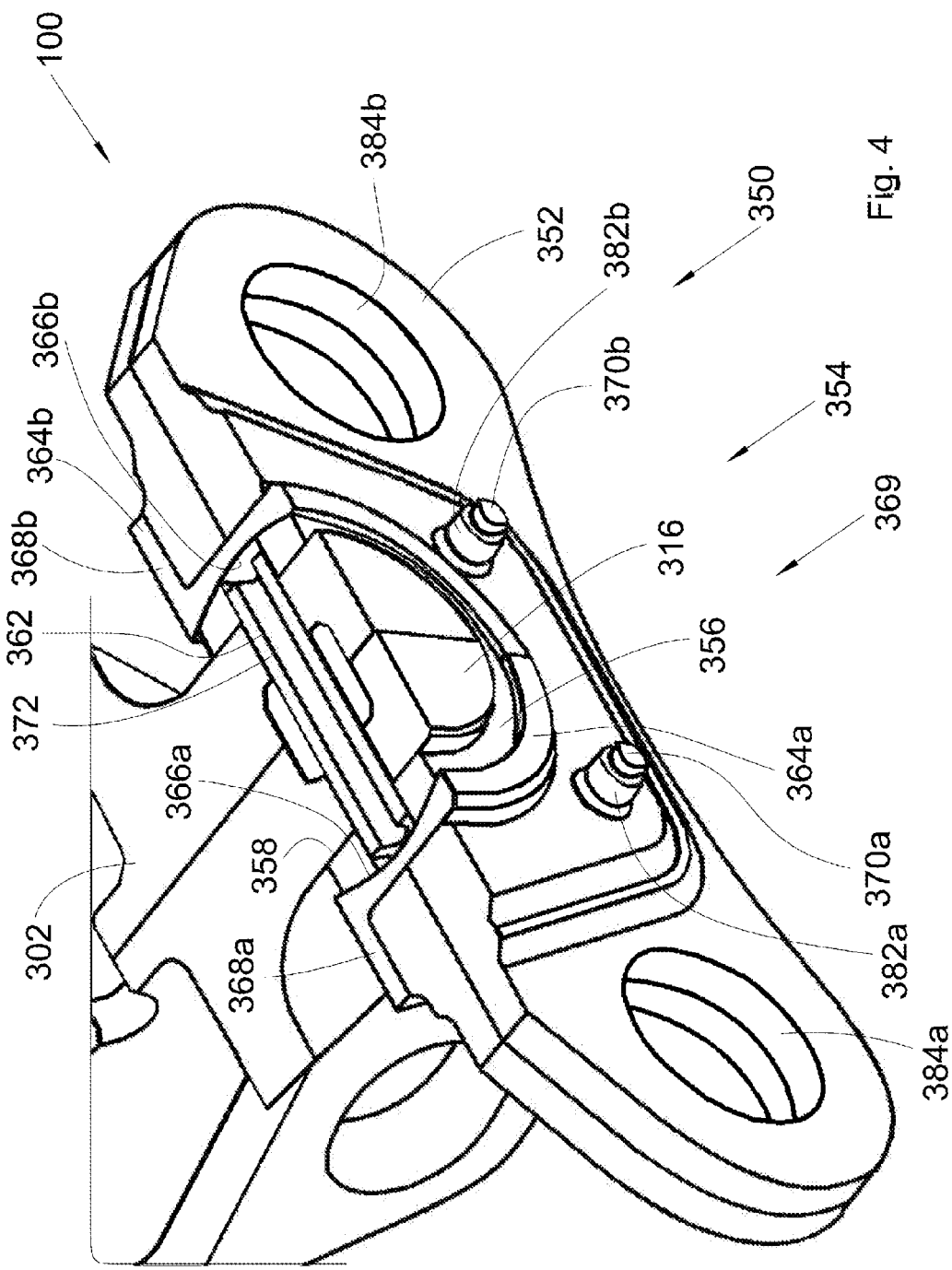
FIG. 4 is a sectional view of the engine fastener of FIG. 3 taken along a substantially horizontal plane.
Figure 5:
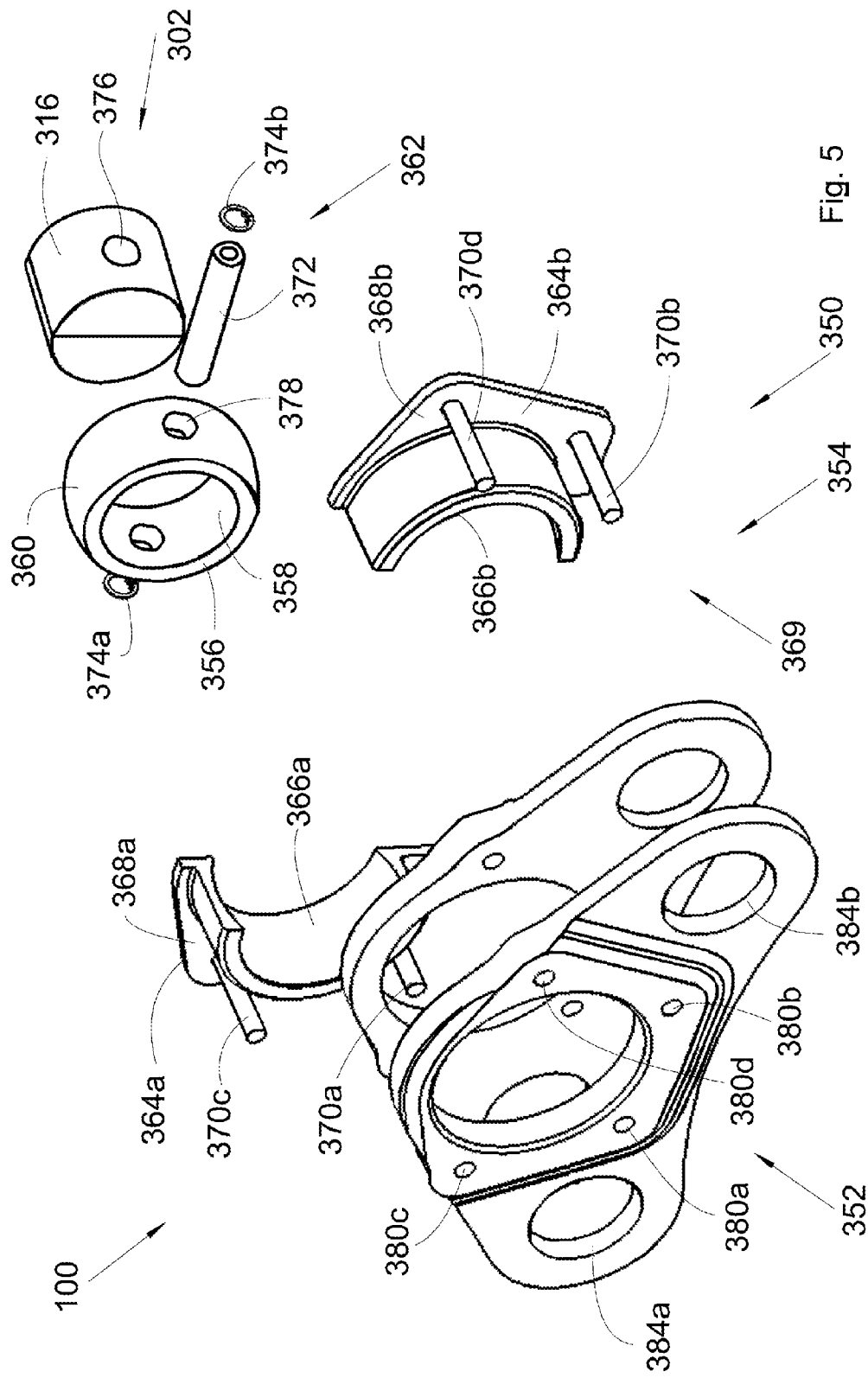
FIG. 5 is an exploded view of the engine fastener of FIG. 3.
Figure 6:
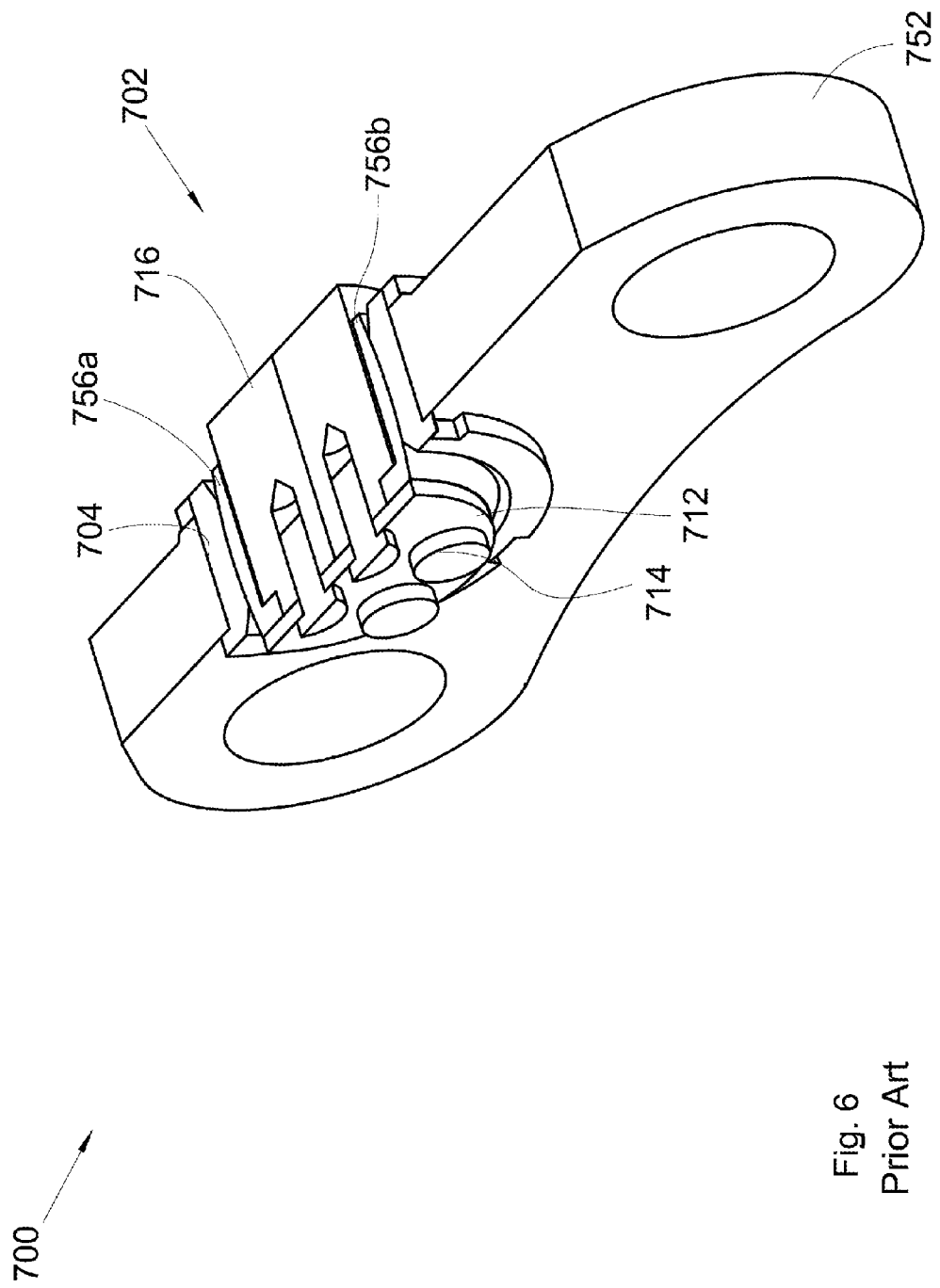
FIG. 6 is a perspective view of a front engine fastener of the prior art.

The fixing assembly 350 will now be described in greater detail with reference to FIGS. 4 and 5.

The fastener body 302 has, at the front end 304 thereof, a cylindrical extension 316 that extends toward the front substantially parallel to the axis X.

The fixing assembly 350 comprises a paddle 352, to which the casing of the compressor 28 is fixed, and connection means 354 joined to the paddle 352 and arranged on the cylindrical extension 316 so as to form a ball-and-socket joint between said cylindrical extension 316 and the paddle 352.

The connection means 354 comprise:
- a ball 356, which is formed in one piece, which has a central bore 358 in which the cylindrical extension 316 fits, and of which the outer surface 360 is a spherical portion,
- fixing means 362 provided so as to fix the ball 356 on the cylindrical extension 316,
- two cages 364a-b, each cage 364a-b having an inner surface 366a-b assuming the form of a spherical portion, the two inner surfaces 366a-b being arranged opposite one another so as to define a housing in which the ball 356 is accommodated, and
- for each cage 364a-b, joining means 369 provided so as to join said cage 364a-b to said paddle 352.

The two inner surfaces 366a-b can thus be movable relative to the ball 356 and can thus support a displacement of the engine 20.

Such an arrangement makes it possible to provide a ball-and-socket joint based on a ball 356 formed by a single component, which limits the risks of jamming of the ball-and-socket joint because the ball 356 is not stressed as screws are tightened.

The dimensions of the outer surface 360 of the ball 356 and of the inner surfaces 366a-b of the cages 364a-b are such that the inner surfaces 366a-b slide without restriction over the ball 356.

The complementary forms of spherical portions of the cages 364a-b and of the ball 356 prevent any displacement of the cages 364a-b and of the ball 356 relative to one another parallel to the axis X.

In the embodiment of the invention presented here, the two cages 364a-b are symmetrical with respect to the plane XZ.

The fixing means 362 here assume the form of a journal 372 and two circlips 374a-b. The cylindrical extension 316 has a radial bore 376, and the ball 356 also has a radial bore 378, which is aligned with the radial bore 376 in the cylindrical extension 316. The journal 372 then fits in the two radial bores 376 and 378. Each circlip 374a-b is inserted into a groove located at each end of the radial bore 378 of the ball 356 so as to axially block the journal 372.

For each cage 364a-b, the joining means 369 assume here the form of at least one threaded rod 370a-d joined to the cage 364a-b and oriented in a forward direction, i.e., in the direction of the paddle 352, and for each threaded rod 370a-d said joining means assume the form of a nut 382a-b.

The paddle 352 has, for each threaded rod 370a-d, a bore 380a-d in which said threaded rod 370a-d fits. A nut 382a-b then screws onto each threaded rod 370a-d so as to sandwich the paddle 352.

In the embodiment of the invention presented here, each cage 364a-b has a plate 368a-b, which extends outwardly relative to the inner surface 366a-b and which carries the threaded rod or rods 370a-d (in this case two), which are oriented from said plate 368a-b toward the front.

During the assembly, each plate 368a-b comes the rest against a rear face of the paddle 352 as the nuts 382a-b are tightened.

The paddle 352 here has two holes 384a-b, in each of which a screw/nut assembly can be placed so as to fix the casing of the compressor 28.

In the embodiment of the invention presented here the fastener body 302 and therefore the cylindrical extension 316 are formed by two hinges that are symmetrical with respect to the plane XZ and which are fixed one against the other.

Similarly, the paddle 352 is formed here by two hinges, which are substantially symmetrical with respect to a plane perpendicular to the axis of the cylindrical extension 316.

The assembly of the front engine fastener 100 thus consists of:
- providing the cylindrical extension 316,
- fitting the ball 356 over the cylindrical extension 316,
- fixing the ball 356 with the aid of the fixing means 362,
- placing the two cages 364a-b on either side of the ball 356,
- providing the paddle 352, and
- joining the cages 364a-b to the paddle 352 with the aid of the joining means 369.

The fixing of the ball 356 on the cylindrical extension 316 consists here in fitting the journal 372 in the two radial bores 376 and 378 and in placing the two circlips 374a-b in position.

The joining of the paddle 352 to the cages 364a-b consists here in fitting each threaded rod 370a-d in a bore 380a-d of the paddle 352 and in tightening a nut 382a-b.

The engine fastener 100 thus has a comparatively reduced number of parts, and the mounting is simple and does not require a specific tool.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine fastener for an aircraft, configured to secure an engine to a pylon, the engine fastener comprising:
   a fastener body configured to be secured to the pylon and having a cylindrical extension, and
   a fixing assembly comprising a paddle configured to be secured to the engine and a connection arrangement joined to the paddle and arranged on the cylindrical extension so as to form a ball-and-socket joint between said cylindrical extension and the paddle,
   the connection arrangement comprising:
   a ball, which is formed in one piece, which has a central bore in which the cylindrical extension fits, and of which the outer surface is a spherical portion,
   a securing element configured so as to fix the ball on the cylindrical extension,
   two cages, each cage having an inner surface assuming the form of a spherical portion, the two inner surfaces being arranged opposite one another so as to define a housing in which the ball is accommodated, and
   for each cage, a joining element configured so as to join said cage to the paddle.

2. The engine fastener as claimed in claim 1, wherein the cylindrical extension has a radial bore, the ball has a radial bore, which is aligned with the radial bore in the cylindrical extension, and the securing element comprises a journal and two circlips, said journal fitting in the two radial bores, and each circlip being inserted into a groove located at each end of the radial bore of the ball.

3. The engine fastener as claimed in claim 1, wherein the joining element has the form of at least one threaded rod joined to the cage and oriented toward the front, and for each threaded rod said joining element has the form of a nut, in that the paddle has, for each threaded rod, a bore in which said threaded rod fits, a nut then screwing onto each threaded rod.

4. The engine fastener as claimed in claim 3, wherein each cage has a plate, which extends outwardly relative to the inner surface and which carries the threaded rod or rods.

5. An engine assembly, comprising:
   an engine,
   a pylon, and
   a fastener system comprising a fastener body configured to be secured to the pylon and having a cylindrical extension, and
   a fixing assembly comprising a paddle configured to be secured to the engine and a connection arrangement joined to the paddle and arranged on the cylindrical extension so as to form a ball-and-socket joint between said cylindrical extension and the paddle,
   the connection arrangement comprising:
   a ball, which is formed in one piece, which has a central bore in which the cylindrical extension fits, and of which the outer surface is a spherical portion,
   a securing element configured so as to fix the ball on the cylindrical extension,
   two cages, each cage having an inner surface assuming the form of a spherical portion, the two inner surfaces being arranged opposite one another so as to define a housing in which the ball is accommodated, and
   for each cage, a joining element configured so as to join said cage to the paddle,
   wherein the fastener body is fixed to the pylon, and the paddle is fixed to the engine.

6. An aircraft, comprising at least one engine assembly, comprising:
   an engine,
   a pylon, and
   a fastener system comprising a fastener body configured to be secured to the pylon and having a cylindrical extension, and
   a fixing assembly comprising a paddle configured to be secured to the engine and a connection arrangement joined to the paddle and arranged on the cylindrical extension so as to form a ball-and-socket joint between said cylindrical extension and the paddle,
   the connection arrangement comprising:
   a ball, which is formed in one piece, which has a central bore in which the cylindrical extension fits, and of which the outer surface is a spherical portion,
   a securing element configured so as to fix the ball on the cylindrical extension,
   two cages, each cage having an inner surface assuming the form of a spherical portion, the two inner surfaces being arranged opposite one another so as to define a housing in which the ball is accommodated, and
   for each cage, a joining element configured so as to join said cage to the paddle,
   wherein the fastener body is fixed to the pylon, and the paddle is fixed to the engine.

* * * * *